M. J. RUARK.
CORPORATION COCK.
APPLICATION FILED DEC. 13, 1917.

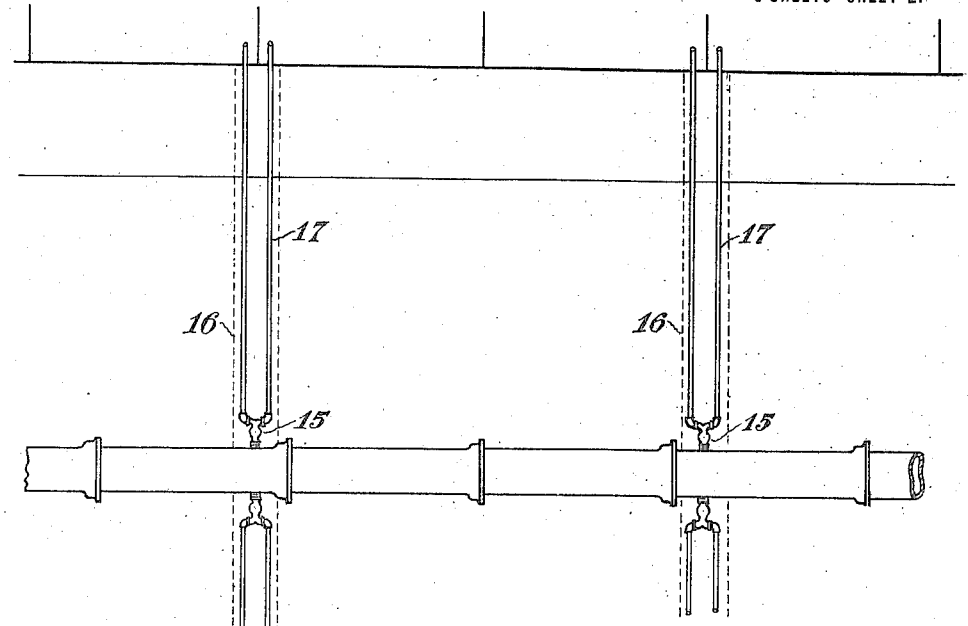
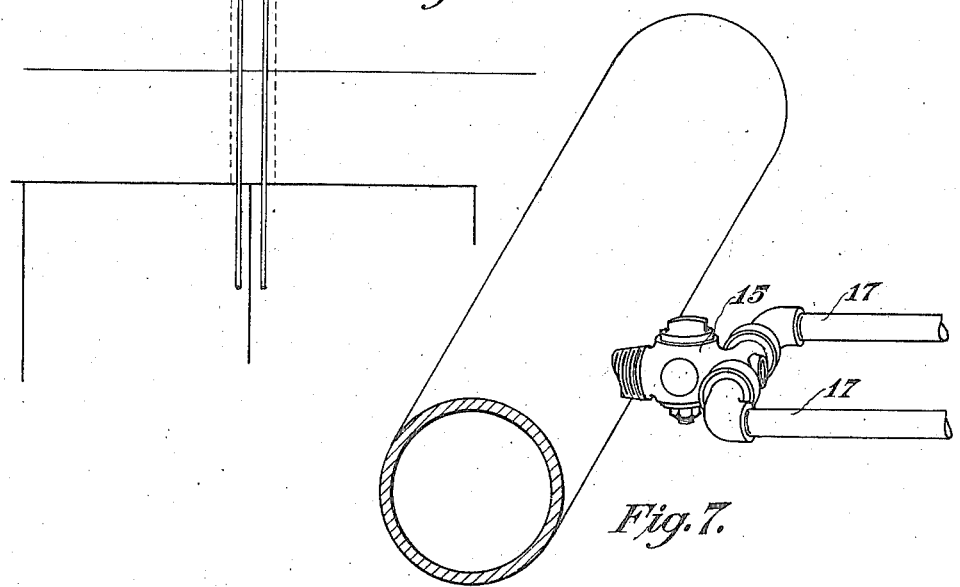
Fig. 8.
Fig. 7.

1,270,329.

Patented June 25, 1918.
3 SHEETS—SHEET 3.

WITNESS:

INVENTOR.
BY
ATTORNEY.

UNITED STATES PATENT OFFICE.

MILTON J. RUARK, OF BALTIMORE, MARYLAND.

CORPORATION-COCK.

1,270,329.  Specification of Letters Patent.  Patented June 25, 1918.

Application filed December 13, 1917. Serial No. 206,886.

*To all whom it may concern:*

Be it known that I, MILTON J. RUARK, a citizen of the United States of America, and resident of the city of Baltimore, State of Maryland, have invented certain new and useful Improvements in Corporation-Cocks, of which the following is a specification.

The corporation cock or fitting for gas or water mains adapted to be applied by means of a tapping machine through which the tapping tools and fitting are passed and which is provided with means for preventing the escape of water after the drilling of the main, is well known to those familiar with the construction, maintenance and operation of municipal water supply systems.

This corporation cock in its present commercial form consists of a straight fitting having one tapered threaded end to be screwed into the main, and an externally threaded straight or cylindrical end to which the service pipe is connected. This latter end is also threaded internally to receive the tapping machine tool by means of which the fitting is screwed into the main; the two openings are in axial alinement. The standard corporation cock or fitting is also provided with a plug valve having its axis transverse to the axis of the fitting and flattened on the end of the shank for engagement by a wrench or equivalent tool.

These standard fittings and the distribution systems to which such fittings or corporation cocks are incident, are subject to important and almost vital disadvantages. The standard fitting connects the service pipe of a single residence and requires an opening in the main for each residence. The tool socket which is engaged by the tool which screws the fitting into the opening in the main is a part of the main channel or central opening of the fitting and this thread being perpetually exposed to the water affords a point of attack by oxidation with little or no tendency toward the cleaning of the surfaces by the flow of the water, the shape of the threads serving as an efficient protection for the rust particles which thus accumulate and not only cause failure of the fitting at this point but choke it by the accumulation of the rust particles.

Municipalities frequently fail to recognize that the construction of water supply and gas systems should precede paving operations and the usual order of construction necessitates the tearing up of newly laid and costly pavements. Also, it has frequently been noted that the failure of city mains is apparently due to the number of holes often made in a single line for the connection of service pipes. These are numerous out of proportion to the residences which must be supplied on account of the presence of various abandoned connections. In old and populous neighborhoods, these are apt to be numerous. Any change which will reduce the number of openings per residence is an improvement.

The present invention relates to a corporation cock and a distribution system with which this cock is combined with the result that the area of pavement torn up in the laying of the system is reduced by half and the number of openings required to be made in the main to supply a given number of houses is reduced in the same proportion. Also the new fitting has the advantage that the seat or socket for the tool is separate from the main channel or pipe opening so that the tool socket, after the corporation cock is inserted, is out of contact with the water and of necessity avoids roughening the inside of the fitting or notching it. Also, the number of corporation cocks necessary to be used for any given number of residences is reduced by half, the number of plug valves by a similar proportion and only four threads or threaded surfaces are necessary to the new fitting or cock required to connect two residences with the main, whereas with the old fitting, six threads were necessary for the two corporation cocks required for the same purpose. Also, in the new type there is only one plug valve to two residences. This effects considerable saving in machine work and also in metal in the production of the cocks or fittings for any job. In view of the vast duplication of these connections in the ordinary municipal water supply system, these savings are all important though some of them are comparatively minute in each instance. While the new corporation cock is adapted for use with the tapping machine, it may of course be inserted without the machine when desired. This is the rule in gas systems and is not unusual in water systems, either where the water is shut off in the main or leakage during installation is neglected.

In the accompanying drawings I have illustrated a corporation cock in two forms embodying my invention and a distribution system of which it is a practically essential feature.

Fig. 7 is a perspective view of a main showing the fitting or corporation cock applied thereto and a short section of service pipe connected to each terminal of the fitting;

Fig. 8 is a plan of a distribution system constructed in accordance with my invention and embodying the improved fitting or corporation cock;

Figures 1, 6:
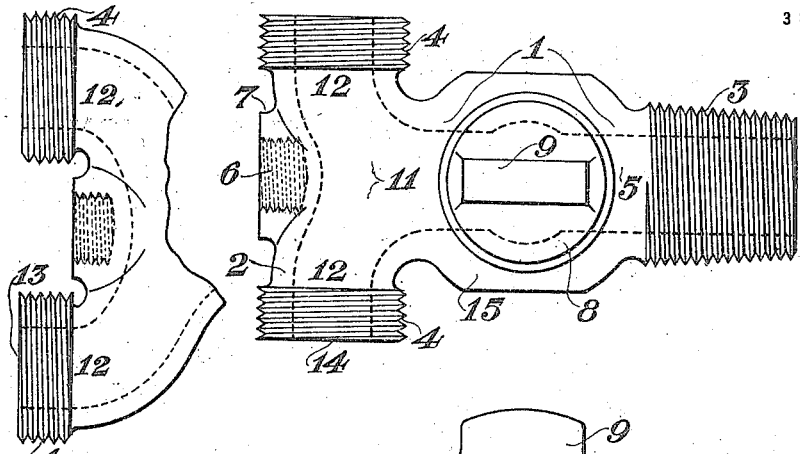
Figure 1 is a plan of the new corporation cock or fitting.
Fig. 6 is a view similar to Fig. 1 showing a modified form of the invention, the figure being broken away, the parts which are identical in the two forms being removed from this figure for convenience of illustration.
Figure 2:
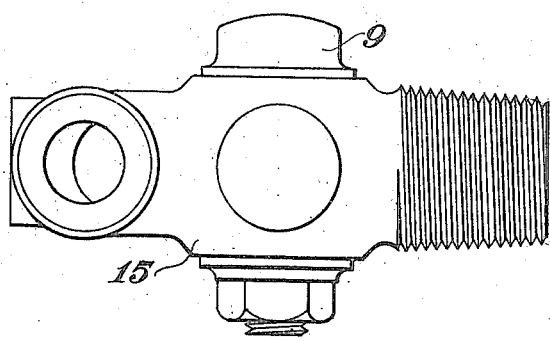
Fig. 2 is an elevation or view taken at right angles to Fig. 1.
Figures 3, 4:
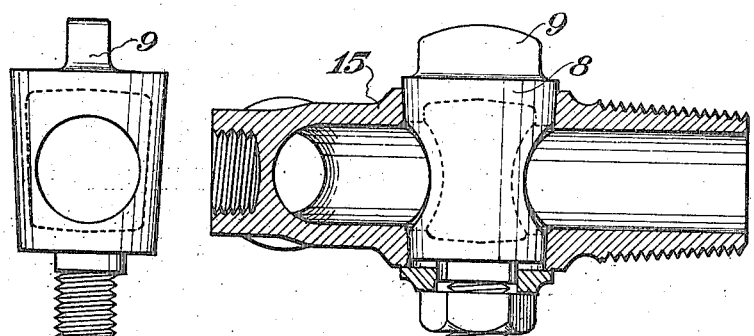
Fig. 3 is a section on the line of the axis and in a plane at right angles to the plane of Fig. 1.
Fig. 4 is an elevation of the plug valve removed, the same being viewed in the direction of the axis, i. e., shown in a plane at right angles to the axis of the central channel or opening of the valve.
Figure 5:
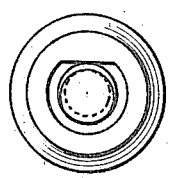
Fig. 5 is a bottom plan of the plug and washer.

Referring to the drawings by numerals, what I consider the preferred or first form of improved corporation cock or fitting, as illustrated in Figs. 1 to 3, may be described as a T having a shank 1 and arms 2, the arms being preferably made short so that the fitting can be used with the ordinary tapping machine. The end of the shank 1 should according to the regular practice be tapered at 3 and threaded on the tapered portion to engage the corresponding threaded opening in the main. The ends of the arms 2 are preferably straight, i. e., cylindrical and threaded at 4, 4 to engage the ordinary pipe coupling or fitting, all three of these threads being preferably standard pipe threads.

At the end of the shank, opposite the tapered threaded portion 3 and at the point of junction of the arms 2, is means for engagement by a tool or spindle disposed in the general direction of the shank of the T. In the present instance, this is shown in the form of a socket 6 suitably threaded for engagement by the tool and bossed at 7 beyond the surface of the casting to give sufficient depth to the socket.

Placed intermediately of the shank of the T, I have shown a tapered plug valve 8 controlling the main passage or channel 5. This plug valve has a flattened portion or other means 9 for engagement by a wrench or other convenient tool, the same being preferably so constructed and placed as to indicate the position of the valve as to whether it is open or closed. The main channel 5 is divided as indicated at 11 into two channels 12 traversing the arms 2 opening through the threaded ends 4.

In Fig. 6 I have shown the fitting with the threaded ends 4 of the arms 2 of the T turned at right angles to the branch passages 12 and in the direction of the axis of the shank. This is to illustrate that the openings 14 of the passages 12 through the threaded ends 4 of the T may be turned in any direction within the scope of the invention.

Referring now to Figs. 7 and 8, I have illustrated a distribution system embodying the corporation cock or fitting 15 and laid out in accordance with the general theory of my invention. This shows the manner in which by the use of this corporation cock, two service pipes 17 leading to adjoining residences are placed in the same trench 16, indicated by dotted lines in Fig. 8, and fed from a single opening in the main. However, this arrangement avoids the objectionable feature of a single pipe joining two residences to the main, particularly in sewerage work to which this arrangement is also applicable, as well as to gas fittings, and makes it possible to put two meters in a single chamber with a further saving of construction work and materials. With the use of a single pipe, in case of stoppage or failure of the service pipe, it is practically impossible to fix the liability on either party. In the present instance, the common passage is of such small extent comparatively as to practically eliminate the possibility of the failure or stoppage of the common passage. Also, the saving of the expense of digging, which amounts to half the excavation in laying a new system or piping a new street, is 50% of the whole incident to the old method.

Figure 10:
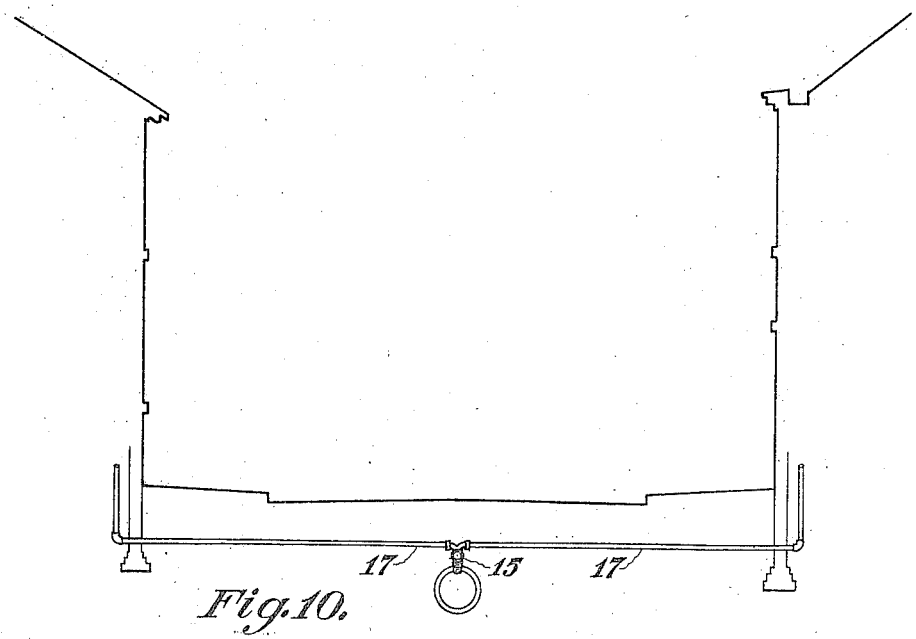
Fig. 10 is a perspective view of a part of the same system.
Figure 9:
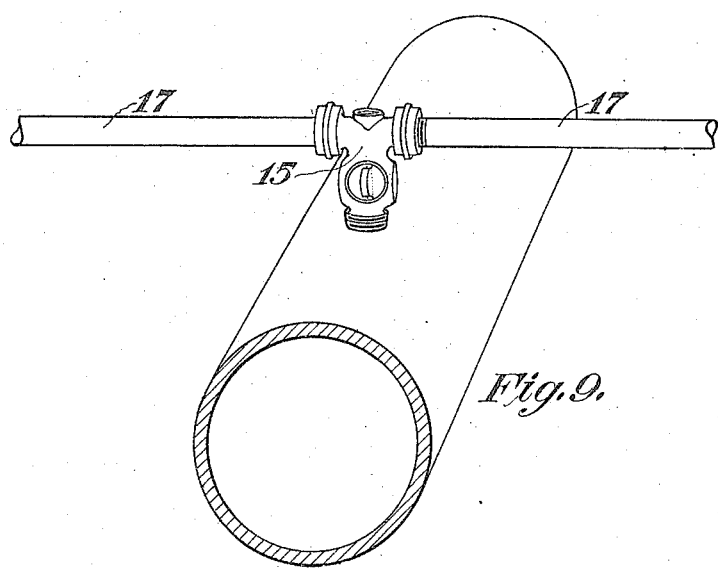
Fig. 9 is a perspective view similar to Fig. 7 showing the corporation cock or fitting applied to a differently arranged distribution system.

Figs. 9 and 10 illustrate a possible application of the improved corporation cock to a system in which two service pipes 17 lead from each cock to neighboring houses on opposite sides of the street.

The ordinary or standard tapping machine is a tubular device with a guide for the tool in alinement with the axis of the tube and means for rotating the tool. It also includes a central flap or non-return valve and a gasket at the open end with means for clamping the open end of the tool to the main, the same being curved to fit the cylindrical surface of the pipe. The hole is first drilled and tapped, the tool being then withdrawn permitting the closure of the valve and preventing the escape of water. Then the T-shaped fitting or twin corporation cock, being made with short arms to enter the tool, having been attached to the end of the tool by means of the screw-threaded socket 6, is inserted in the tapping machine and passed through the non-return valve, the plug valve 8 in the fitting being closed. The fitting is thus immediately inserted in the threaded opening and rotated to effect the engagement of the thread on the end of the shank of the fitting with the opening in the main. When the fitting or cock is thus seated, the tapping machine is unclamped and removed. Connections may be made at the convenience of the operator with the threaded ends 4 of the T and after these connections are suitably joined to the house system, the installation being completed, the plug valve 8 is opened and the system is in operation.

I have thus described my invention specifically and in detail as to two forms thereof in order that its nature and application may be clearly understood. The term T is illustrative rather than technical in its application, including a shank with two or more lateral openings. All of the specific terms herein are used in the broader rather than in the more limited sense.

What I claim and desire to secure by Letters Patent is:

1. A corporation cock in the form of a T having a seat for a tapping machine tool intermediate the arms of the T.

2. A pipe fitting in the form of a T having the end of the shank tapered and threaded and the arms of the T threaded, and a seat for a tapping machine tool at the end of the shank opposite the tapered thread and intermediate the arms of the T.

3. A corporation cock consisting of a T having the end of the shank tapered and threaded, the arms of the T being threaded, a point of engagement for a tapping machine tool intermediate the arms of the T and in substantial alinement with the axis of the shank, and a valve in the shank of the T.

4. A corporation cock consisting of a T having the end of the shank tapered and threaded, the arms of the T being threaded, a point of engagement for a tapping machine tool intermediate the arms of the T and in substantial alinement with the axis of the shank, and a valve in the shank of the T, the valve having gripping means for a tool by means of which it may be turned, the latter being so arranged as to indicate the position of the valve as to whether it is open or closed.

5. A distribution system including a main, a corporation cock tapped into the main and made in the form of a T, a service pipe connected to each arm of said T, the pipes being laid in a single ditch and connected to adjoining houses.

6. A corporation cock in the form of a T having the end of the shank threaded and tapered, the ends of the arms threaded, and a valve in the shank.

Signed by me at Baltimore, Maryland, this 7th day of December, 1917.

MILTON J. RUARK.

Witnesses:
ALICE G. DONEGAN,
ZELLA KUHN.

Copies of this patent may be obtained for five cents each, by addressing the "Commissioner of Patents, Washington, D. C."